United States Patent
Rahman et al.

(10) Patent No.: US 6,874,940 B2
(45) Date of Patent: Apr. 5, 2005

(54) LOW POWER HYBRID BEARING

(75) Inventors: Mohamed Mizanur Rahman, San Jose, CA (US); Gunter K. Heine, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 39 days.

(21) Appl. No.: 10/411,974

(22) Filed: Apr. 10, 2003

(65) Prior Publication Data

US 2004/0013330 A1 Jan. 22, 2004

Related U.S. Application Data

(60) Provisional application No. 60/371,771, filed on Apr. 10, 2002.

(51) Int. Cl.[7] ................................. F16C 17/10
(52) U.S. Cl. ...................................... 384/110
(58) Field of Search ................... 384/109, 110, 384/108, 112, 118

(56) References Cited

U.S. PATENT DOCUMENTS 6,020,664 A    2/2000    Liu et al.

*Primary Examiner*—Lenard A Footland
(74) *Attorney, Agent, or Firm*—Raghunath S. Minisandram; Jesus Del Castillo

(57) ABSTRACT

A bearing system in which an axially stiff narrow gap fluid dynamic gas bearing is preloaded by an axially less stiff larger gap fluid dynamic bearing. As an example two fluid dynamic bearings are provided spaced apart along a shaft, radially aligned with an air/gas filled spherical or conical or similar type bearing. A shaft end thrust bearing is also defined for axial support.

24 Claims, 4 Drawing Sheets

LOW POWER HYBRID BEARING

CROSS REFERENCE TO A RELATED APPLICATION

This invention is based on U.S. provisional application Ser. No. 60/371,771 filed Apr. 10, 2002 and entitled Low Power Hybrid Bearing, filed in the name of Mohamed Mizanur Rahman and Gunter K. Heine. The priority of this provisional application is hereby claimed, and the application is incorporated herein by reference.

FIELD OF THE INVENTION

This invention relates generally to the field of fluid dynamic journal bearings, and more specifically to a design comprising two bearings, one air or gas and one fluid in order to provide balance and reduced power consumption in supporting a shaft for rotation.

BACKGROUND OF THE INVENTION

Disc drives are capable of storing large amounts of digital data in a relatively small area. The disc drives store information on one or more spinning recording media. The recording media conventionally takes the form of a circular storage disk in a plurality of concentric circular recording tracks. A typical disk drive has one or more disks for storing information. This information is written to and read from the disks using read/write heads mounted on actuator arms that are moved from track to track across surface of the disk by an actuator mechanism.

Generally, the disks are mounted on a spindle that is turned by a spindle motor to pass the surfaces of the disks under the read/write heads. The spindle motor generally includes a shaft supporting from a base plate and a hub to which the spindle is attached having a sleeve into which the shaft is inserted. Permanent magnets, which are typically attached to the hub, interact with a stator winding to rotate the hub relative to the shaft. This description is consistent with a fixed shaft motor; however, the invention to be described below is as easily useable with a motor comprising a rotating shaft, an end of the shaft supporting the hub for rotation to support the rotation of the disks.

In either case, to facilitate rotation, one or more bearings are disposed between the hub or sleeve and the shaft.

Over time, disk drive storage density has tended to increase, and the size of the storage system has tended to decrease. This trend has led to greater emphasis on restrictive tolerances in the manufacturing and operation of magnetic storage disk drives. For example, to achieve increased storage density, read/write heads must be placed increasingly close to the surface of the storage disk.

As a result, the bearing assembly which supports the storage disk is of critical importance. A typical bearing assembly of the prior art comprises ball bearings supported between a pair of bearing paces which allow a hub of a storage disk to rotate relative to a fixed member. However, ball bearing assemblies have many mechanical problems such as wear, run-out and manufacturing difficulties. Moreover, resistance to operating shock and vibration is poor because of damping.

An alternative bearing design is a fluid dynamic bearing. In a fluid dynamic bearing, lubricating fluid such as air or liquid provides a bearing surface between a fixed member of the housing (e.g., the shaft) and a rotating member which supports the disk hub. Typical lubricants include oil or similar hydrodynamic fluids. Hydrodynamic bearings spread the bearing interface over a large surface area in comparison with a ball bearing assembly, which comprises a series of point interfaces. This is desirable because the increased bearing surface reduces wobble and run-out between the rotating and fixed members. Further, the use of fluid in the interface area imparts damping effects to the bearing which helps to reduce non-repeatable run-out.

It is also known that the stiffness to power ratio is a primary way of measuring the efficiency of the spindle bearing assembly. Most known fluid dynamic bearings today in commercial use are made with oil as the fluid which is maintained in the gap between the two relatively rotating surfaces. This maintains the stiffness of the bearing, that is the resistance to shock and vibration; however, because of the relatively high viscosity of such fluids, which at lower temperatures, such as at startup, considerable power is consumed to establish and maintain high speed rotation.

SUMMARY OF THE INVENTION

It is an objective of the present invention to provide a bearing system in which the stiffness is maintained while the power consumption necessary to establish and maintain rotation of the bearing system is reduced.

It is a further objective of the invention to provide a bearing system in which a relatively stiff, low power system is achieved without utilizing fluid dynamic bearings with extremely small gaps in all embodiments.

These and other objectives of the invention are provided in a bearing system in which a gas bearing is preloaded by a fluid dynamic bearing. More specifically, pursuant to the present invention a system is provided in which two fluid dynamic bearings are provided radially spaced apart to support a shaft for rotation, one of the bearings comprising a fluid dynamic bearing, the other comprising an air bearing. In this exemplary embodiment, the fluid dynamic bearing has a smaller radius, while the air bearing has a relatively large radius so that power consumption is diminished while stiffness is maintained.

In a typical embodiment, the air bearings is a conical bearing comprising a cone supported on the sleeve, with a surrounding hub providing a surface facing an outer surface of the cone, the gaps being defined between the surfaces of the cone and the hub. An alternative embodiment, is a spherical bearing.

Typically a thrust bearing is also provided on the end of the shaft to support the shaft for rotation.

Other features and advantages of the invention and alternative approaches will be apparent to a person of skill in the art who studies the following exemplary embodiments of the invention, given with reference to the following drawings.

DETAILED DESCRIPTION OF THE PREFERRED EMBODIMENTS

Figure 1:
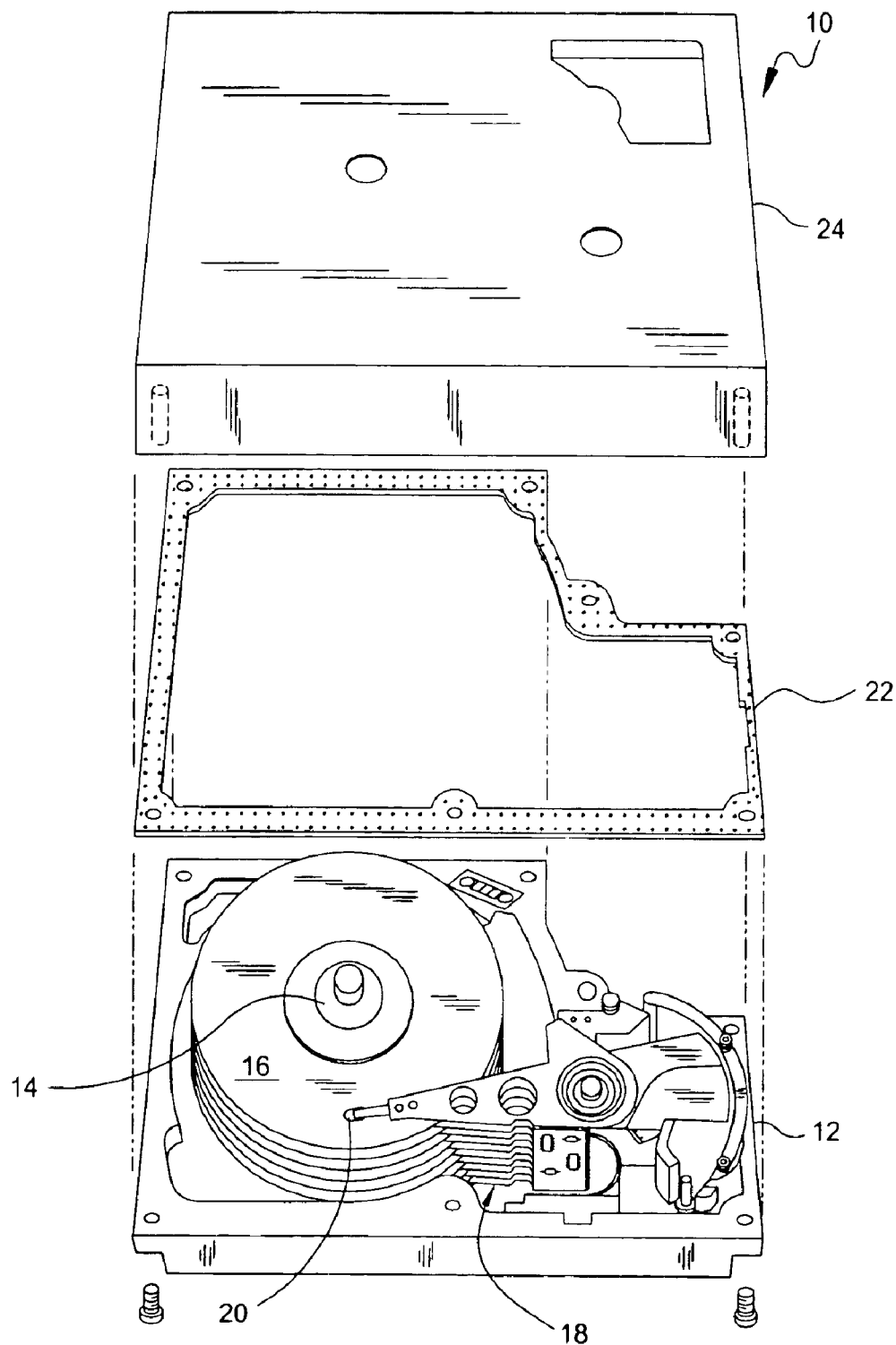
FIG. 1 is a perspective view of a disc drive in which the bearing system of the present invention is especially useful.

FIG. 1 depicts a plan view of an embodiment of a typical disc drive in which embodiments of the present invention, because of its stability and long life are especially useful. Referring to FIG. 1, the disc drive 10 includes a housing base 12 and a top cover 14. The housing base 12 is combined with cover 14 to form a sealed environment to protect the internal components from contamination by elements outside the sealed environment. The base and top cover arrangement shown in FIG. 1 is well known in the industry. However, other arrangements of the housing components have been frequently used and there is no particular limitation to the configuration of the housing.

The disc drive further includes a disk pack comprising one or more disks mounted for rotation on a spindle motor not shown by disc clamp 18. The disc pack 16 of one or more discs provides disks mounted for rotation about a central axis. Each disc surface has an associated read/write head 20 which is mounted to disc drive 10 for communicating with the disc surface. In the example shown in FIG. 1, read/write heads 20 are supported by flextures 22 which are in turn attached to head mounting arms 24 of an actuator body 26. The actuator shown in FIG. 1 is of the type known as a rotary moving coil actuator and includes a voice coil motor shown generally at 28. The voice coil motor rotates the actuator body 26 with its attached read/write heads 20 about a pivot shaft 30 to position read/write heads 20 over a desired data track along a path 32. While the rotary actuator is shown in FIG. 1, the invention may be used with other disc drives having other type of actuators such as linear actuators; in fact, the specific disc drive shown herein is intended only to be exemplary, not to be limiting in any sense.

Figure 2:
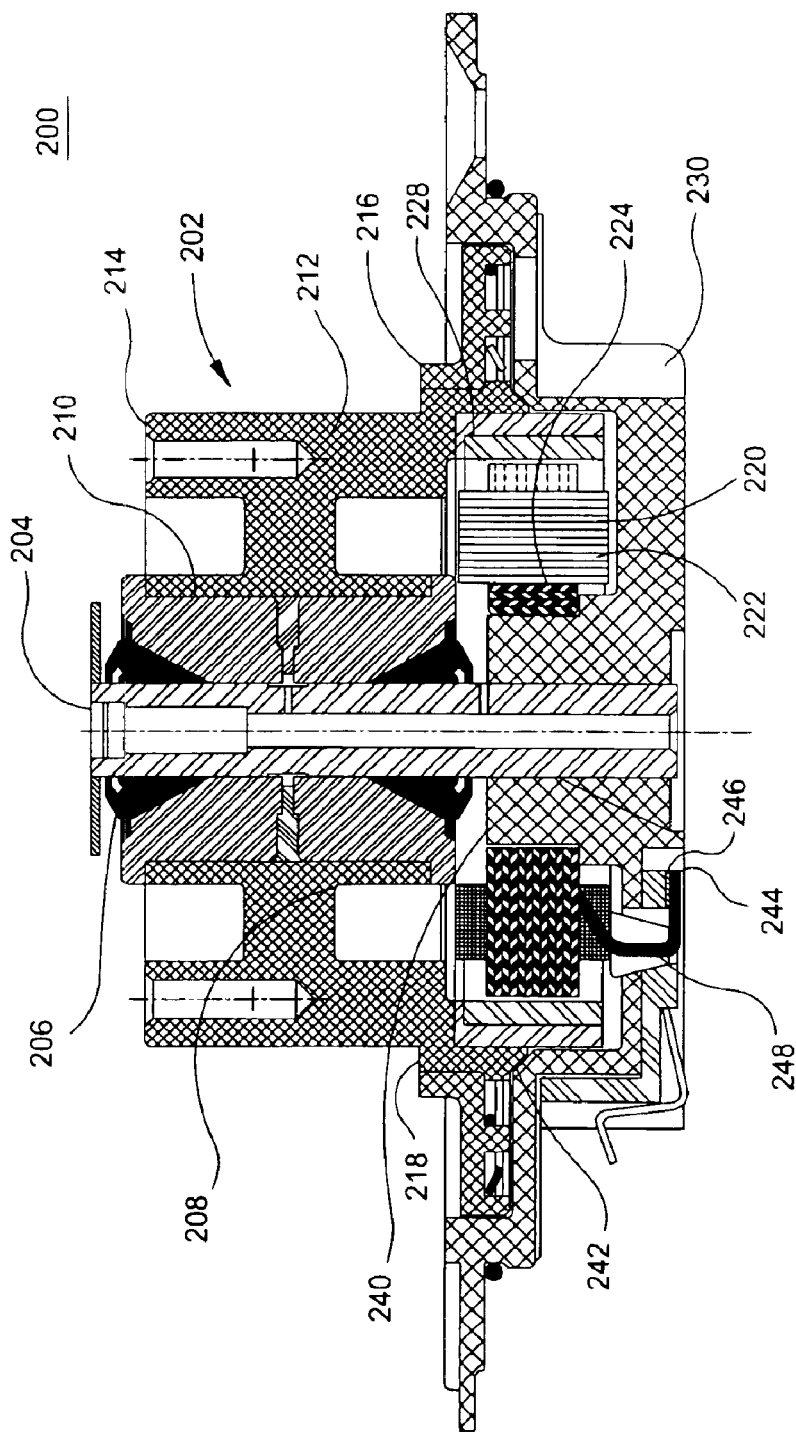
FIG. 2 is a vertical sectional view of a known bearing system as used in the prior art.

FIG. 2 is a vertical sectional view of a known spindle motor including a set of conical hydrodynamic bearings 206, 208 which support the shaft 204 and hub 202 for relative rotation. The motor is a brushless direct current motor 200 comprising a hub 202 rotatably mounted about the stationary shaft 204 by the upper and lower bearings 206 and 208 respectively. The hub 202 which supports one or more discs such are as shown in FIG. 1 for rotation is formed in a generally inverted U shape as seen in cross section, and has an inner annulus sleeve 210 and an outer cylindrical surface 212 and a top portion 214. Outer cylindrical surface 212 includes a shoulder 216 for supporting one or more discs in the contaminant free environment which encloses the motor and discs. A plurality of storage discs separated by spacers or washers could easily well be stacked along the vertical length of outer cylindrical surface 212. The inner portion of hub 202 operably receives a stator, generally designed 220, including a stator lamination stack 224 and stator windings 222. A permanent magnet 228 is mounted on a back iron 229 supported from outer annular arm 212 for magnetically interacting with magnetic reactor stator laminations stack 224 and stator windings 222. It is to be understood that a plurality of permanent magnets may make up the magnet 226 in this design.

The disc drive motor 200 is mounted to a frame or base member 230 of disc drive assembly 200 by inserting member 230. Thereto by inserting it in the recess in member 230.

Stator support 240 surrounds stationary shaft 204 and supports stator 220 in a substantially vertical position. Stator support 240 comprises a boss 242 formed in base plate number 230 which serves to maintain disc drive motor 200 in a spaced relation with respect to base member 230. The stator 220 is bonded to the base 230.

A circuit connector 244 is mounted to a lower surface of the base member 230. The circuit connector 244 is electronically connected to stator windings 222 by a wire 248 for electrical communication between the stator windings and a printed circuit board (not shown). By energization of this circuitry, torque is created to run the motor; control signals cause constant speed rotation of the hub about the shaft 204 as supported by the upper and lower conical bearings 206, 208.

Figure 3:
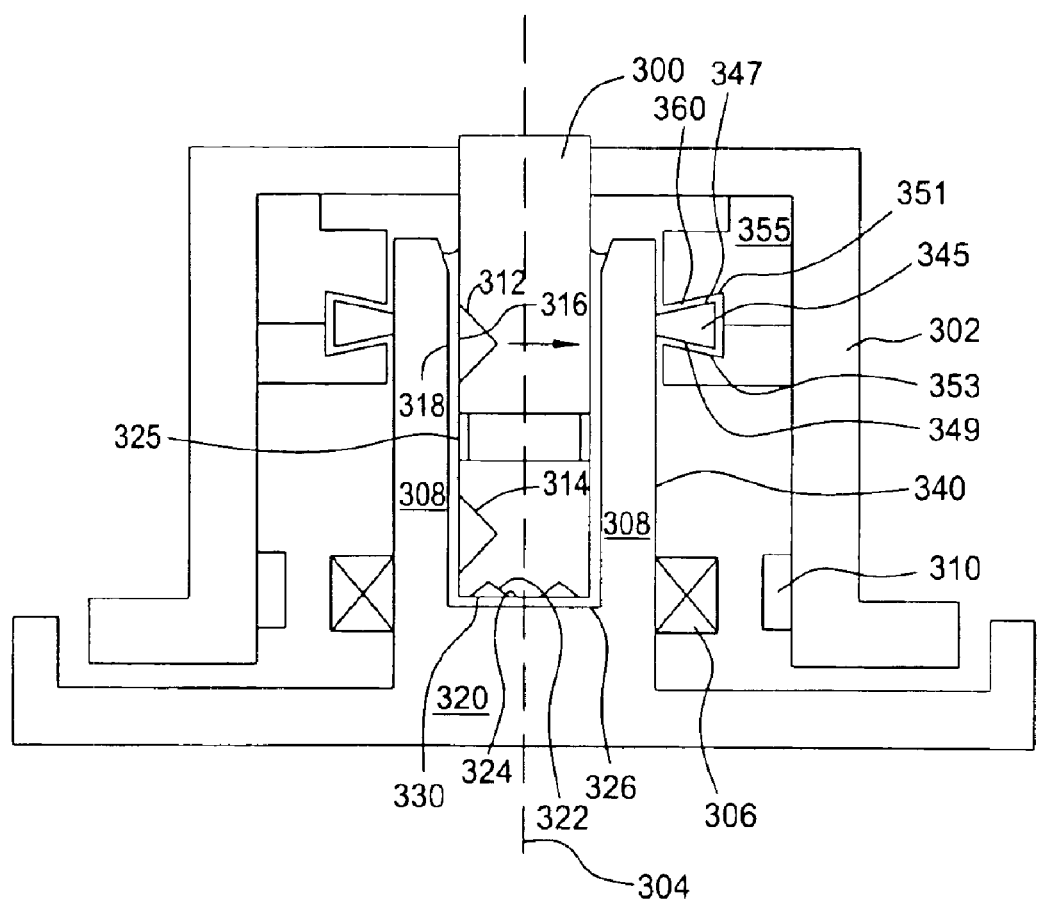
FIG. 3 is a vertical sectional view of a bearing system according to the present invention.

Considering the known fluid dynamic bearings such as shown in FIGS. 2 and 3, the efficiency of the spindle bearing assembly may be expressed in the form of a stiffness to power ratio with stiffness being the ability to withstand shock, and power being power consumed to establish and maintain relative rotation between the two sides of the bearing as supported by the fluid in the gap between those two sides. Typically, in designing a motor using hydrodynamic bearings, the specification is established either for stiffness or for power; the objective then becomes to both achieve the specification, and to optimize this ratio of stiffness to power.

It is known that the stiffness to power ratio is proportional to one over the gap squares, hence the smallest gap will lead to the greatest efficiency.

It is difficult, however, to make a fluid bearing with a really small gap because of tight tolerances make the bearing more expansive.

It is further known that power is proportional to speed squared, times the viscosity times the radius cubed, times the length of the bearing, divided by the gap.

It is also known that the viscosity of air is about 1/256 of a typical oil at 70° C. which is considered to be a typical operating temperature for a fluid bearing; it is further known that the viscosity of air is relatively independent of temperature compared to fluid, this minimizes the dilemma of having to make tradeoffs of low temperature power (which is where most power is consumed in a fluid bearing) versus high temperature stiffness (which is where, due to the decrease in viscosity, stiffness is typically lost in a bearing utilizing fluid in the gap).

In an ideal bearing maximum stiffness and damping is combined with minimum power loss. One of the ways to achieve this design objective is to design a hybrid bearing where one part of the bearing would by hydro bearing (using a liquid) and another part of the bearing would be an air bearing. Since most of the radial stiffness and damping come from journal, it would be preferable to utilize liquid hydro journal bearing with smaller radius and an air conical/spherical bearing with larger radius to provide axial stiffness.

Figure 4:
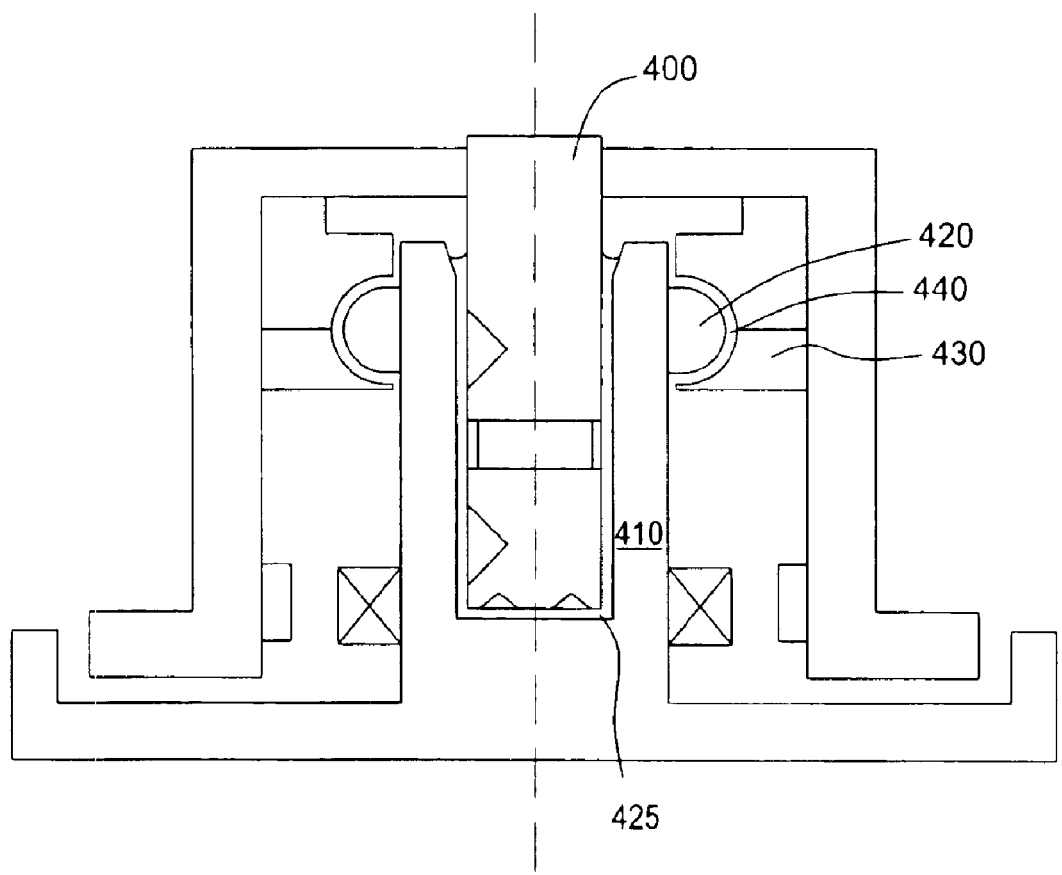
FIG. 4 is a vertical section of an alternative embodiment of the present invention.

A vertical sectional view of a combined fluid dynamic bearing system comprising a liquid bearing in parallel with an air bearing incorporating the principals of the present invention is shown in FIG. 3, and a further alternative in FIG. 4. In FIG. 3, a shaft 300 supports a hub 302 for rotation about a central axis 304. The rotation is created by a motor of a type known in the art represented by a stator 306 supported from a sleeve 308 which surrounds the shaft and a magnet 310 which is supported from the hub and aligned the stator so that it interacts with the stator to cause rotation of the hub. To support rotation of the shaft 300 relative to the sleeve 308, two journal bearings 312, 314 are provided axially spaced along the shaft 300. These journal bearings are of a design well known in the art, and comprise grooves on one of the surfaces 316, 318 of the shaft and sleeve respectively. Relative rotation of the shaft and sleeve pressurize fluid in the gap to support the shaft for rotation. To further support the shaft for rotation, relative to the base 320, a thrust bearing 322 is defined comprising grooves on one of the surfaces 324, 326 of the shaft and base respectively. As the shaft rotates relative to the base, the grooves pressurize the fluid in the gap 330 between the shaft and base, thereby maintaining separation between the end 324 of the shaft and the facing surface 326 of the base 320.

Although such use of journal bearings and thrust plate can support the shaft for rotation, and provide a desirable amount of stiffness to the system, it is also apparent that substantial power is required to maintain the rotation of the shaft 300 relative to the sleeve 308 because the presence of the liquid fluid in the gap 330. Therefore, in order to reduce the amount of power required to support relative rotation and reduce the size of the journal bearings and thrust plate bearing which must be provided, (or increase their gap where fluid pressurization occurs to reduce power consumed) according to this invention an additional bearing is provided on the outer surface of the sleeve 308 which supports the hub for rotation. In the embodiment of FIG. 3, a generally cone shaped element 345 has angular surfaces 347, 349 which cooperate with facing, mating surfaces 351, 352, 353 of a frame 355 supported from the hub 302. Grooves are defined on either surface of each pair of mating surfaces to define a air or gas bearing. Air or gas is maintained in the gap 360 which exists between these facing surfaces of the cone and frame. To effectively pressurize the air or gas, grooves 370, 371, 372 are preferably provided on one surface in all 3 gap regions, although less than 3 grooved gaps may be used. Since air or gas is used, power consumption is small even though the radius is relatively large. Based on the discussion above, it can be immediately seen that while this bearing provides additional support for supporting rotation of the shaft and hub relative to the sleeve 308, it does so with less power consumed and provides the support with less power consumption because of the use of a very low viscosity air or gas. Therefore, the combination of this air bearing at a larger radius using a low viscosity fluid and the journal bearing of a smaller size and at a shorter radius using a higher viscosity fluid supports the shaft and hub for rotation with greater efficiency than the approach used in the prior art. It can further be seen that in addition to supporting the shaft for rotation and providing radial stiffness, this conical bearing will also provide a force in the axial direction to counteract the lifting force generated by the thrust bearing at gap 330 so that the position of the shaft and hub relative to the sleeve during rotation remains stable.

FIG. 4 is a further alternative to the design of FIG. 3 and is in all respects based on the design of FIG. 3 except with the substitution of a generally spherical element 420 cooperating with the internal frame 430 with grooves on either of the mating surfaces. The gap 440 between the sphere 420 and frame 430 is filled with gas or air and grooves 440 are provided on one surface of the gap to pressurize the gas. As in the previous design, this gas bearing helps to aid in the stiffness and damping of the rotating shaft 400 relative to the sleeve 410 while consuming little power because the low viscosity of the air or gas in the gap 440.

As with the conical design, the sphere also provides some axial restraining force relative to the thrust bearing 425 in order to maintain the axial positioning of the shaft 400.

In both of these designs, the objective has been to maintain the dynamic performance while minimizing power consumption by providing that one of the bearings has a large gap with a high viscosity fluid, and the other bearing having a small gap and a low viscosity gas or air in the gap.

Both of these bearing can be dimensioned so that the dynamic performance on the spindle from both bearings is as similar as possible to each other, so that no imbalance movement results. Further the total axial play in such a bearing combination will be somewhat diminished relative to the axial play obtained in a corresponding pair of fluid bearings. Thus, although the axial play is not idealized, it is an improvement over standard two bearing designs in terms of power consumption and stiffness and does achieve some reduction in axial play.

The disclosed embodiments are achievable with current manufacturing technologies at reasonable cost. By the same token, the stiffness, while not improved because of the presence of one air bearing, is either maintained or close to being maintained while the total power consumed is minimized. For example, today's high-speed spindles take about half of the whole mechanical power in the system; a hybrid such as disclosed above can save about 30% of that power consumption.

Other features and advantages of the invention would be apparent to a person of skill in the art who studies this disclosure. Therefore, the scope of the invention is to be limited only by the following claims.

What is claimed is:

1. A bearing system comprising a shaft, a hub, supported for rotation with the shaft, a sleeve positioned between the shaft and at least part of the hub, and bearing means for supporting the shaft and the hub for relative rotation comprising a liquid bearing with a first gap and an air bearing with a second gap radially spaced in the system, wherein the first gap is larger than the second gap.

2. A bearing system as claimed in claim 1 wherein said bearing means comprises the liquid bearing between the shaft and sleeve and the air bearing between the sleeve and the hub.

3. A bearing system as claimed in claim 2 wherein the air bearing comprises a conical element supported from the sleeve cooperating with a fixture supported from the hub.

4. A bearing system as claimed in claim 3 wherein air is pressurized in the second gap between at least one surface of the conical element and a mating surface of the fixture.

5. A bearing system as claimed in claim 4 wherein the sleeve is mounted to a base of a disc drive housing.

6. A bearing system as claimed in claim 5 wherein air is pressurized in the second gap between a surface of the conical element and a mating surface of the fixture.

7. A bearing as claimed claim 6 wherein the thrust bearing comprises a groove pattern on one of the surfaces of the end surface of the shaft and the facing surface of the sleeve.

8. A bearing system as claimed in claim 7 wherein the liquid bearing comprises at least one grooved region defined on the surface of the shaft or the sleeve to pressurize fluid in the first gap between the surfaces of the shaft and the sleeve.

9. A bearing system as claimed in claim 2 wherein the liquid bearing is radially adjacent the air bearing.

10. A bearing system, comprising:

a shaft, a hub, supported for rotation with the shaft, a sleeve positioned between the shaft and at least part of the hub, and bearing means for supporting the shaft and the hub for relative rotation comprising a liquid bearing and an air bearing radially spaced in the system;

wherein the bearing means comprises the liquid bearing between the shaft and sleeve and the air bearing between the sleeve and the hub; and wherein the air bearing comprises a spherical element supported from the sleeve cooperating with a fixture supported from the hub.

11. A bearing system as claimed in claim 10 wherein air is pressurized in a gap between at least one surface of the spherical element and a mating surface of the fixture.

12. A bearing system as claimed in claim 11 wherein the sleeve is mounted to a base of a disc drive housing.

13. A bearing system as claimed in claim 12 wherein air is pressurized in a gap between a surface of the spherical element and a mating surface of the fixture.

14. A bearing as claimed in claim 13 wherein the thrust bearing comprises a groove pattern on one of the surfaces of the end surface of the shaft and the facing surface of the sleeve.

15. A bearing system as claimed in claim 14 wherein the liquid bearing comprises at least one grooved region defined on the surface of the shaft or the sleeve to pressurize fluid in a gap between the surfaces of the shaft and the sleeve.

16. A bearing system, comprising:

a shaft, a hub, supported for rotation with the shaft, a sleeve positioned between the shaft and at least part of the hub, and bearing means for supporting the shaft and the hub for relative rotation comprising a liquid bearing and an air bearing radially spaced in the system;

wherein the bearing means comprises the liquid bearing between the shaft and sleeve and the air bearing between the sleeve and the hub;

wherein the air bearing comprises a conical element supported from the sleeve cooperating with a fixture supported from the hub;

wherein air is pressurized in a gap between at least one surface of the conical element and a mating surface of the fixture; and wherein the bearing system is mounted in a base of a disc drive, the fluid bearing further comprising a thrust bearing adjacent to the base and defined between the end of the shaft and the base.

17. A disc drive comprising a housing including a base and a cover for enclosing a defined region, a spindle motor supporting one or more discs for constant rotation, and an actuator supporting at least one transducer associated with each of said discs, the spindle motor comprising a shaft supported for rotation within a sleeve, the shaft supporting a hub for rotation, and a bearing system comprising first and second bearings, one of the bearings being a fluid bearing with a first gap between the shaft and the sleeve, the other of the bearings being an air bearing with a second gap defined between the sleeve and the hub, wherein the first gap is larger than the second gap.

18. A bearing system as claimed in claim 17 wherein the air bearing is defined radially aligned with the fluid bearing.

19. A bearing system as claimed in claim 18 wherein the air bearing comprises a conical element supported from the sleeve cooperating with a fixture supported from the hub.

20. A bearing system as claimed in claim 19 wherein the fluid bearing comprises at least one grooved region defined on the surface of the shaft or the sleeve to pressurize fluid in a gap between the surfaces of the shaft and the sleeve.

21. A bearing system as claimed in claim 20 wherein the fluid bearing is radially adjacent the air bearing.

22. A disc drive comprising a housing including a base and a cover for enclosing a defined region, a spindle motor supporting one or more discs for constant rotation, and an actuator supporting at least one transducer associated with each of said discs, the spindle motor comprising a shaft supported for rotation within a sleeve, the shaft supporting a hub for rotation, and a bearing system comprising first and second bearings, one of the bearings being a fluid bearing between the shaft and the sleeve, the other of the bearings being an air bearing defined between the sleeve and the hub;

wherein the air bearing is defined radially aligned with the fluid bearing; and the air bearing comprises a spherical element supported from the sleeve cooperating with a fixture supported from the hub.

23. A bearing system as claimed in claim 22 wherein the fluid bearing comprises at least one grooved region defined on the surface of the shaft or the to pressurize fluid in a gap between the surfaces of the shaft and the sleeve.

24. A bearing system as claimed in claim 23 wherein the fluid bearing is radially adjacent the air bearing.

* * * * *